United States Patent
Flinck

(10) Patent No.: US 7,366,145 B2
(45) Date of Patent: *Apr. 29, 2008

(54) FAST RECOVERY FROM UNUSABLE HOME SERVER

(75) Inventor: Hannu Flinck, San Jose, CA (US)

(73) Assignee: Nokia Corporation, Espoo (FI)

( * ) Notice: Subject to any disclaimer, the term of this patent is extended or adjusted under 35 U.S.C. 154(b) by 942 days.

This patent is subject to a terminal disclaimer.

(21) Appl. No.: 10/290,491

(22) Filed: Nov. 8, 2002

(65) Prior Publication Data

US 2004/0090942 A1    May 13, 2004

(51) Int. Cl.
*H04Q 7/24* (2006.01)
(52) U.S. Cl. .............. 370/338; 370/352; 370/356; 455/432.1; 455/433
(58) Field of Classification Search .......... 370/338, 370/352, 356, 395.52, 401, 331, 332; 455/432.1, 455/433, 436–439
See application file for complete search history.

(56) References Cited

U.S. PATENT DOCUMENTS

| | | | |
|---|---|---|---|
| 6,430,698 B1* | 8/2002 | Khalil et al. | 714/4 |
| 6,578,085 B1* | 6/2003 | Khalil et al. | 709/241 |
| 6,850,532 B2* | 2/2005 | Thubert et al. | 370/401 |
| 6,987,771 B2* | 1/2006 | Shimizu et al. | 370/401 |
| 6,990,086 B1* | 1/2006 | Holur et al. | 370/329 |
| 7,023,828 B2* | 4/2006 | Korus et al. | 370/338 |
| 2001/0046223 A1 | 11/2001 | Malki et al. | |
| 2002/0128008 A1 | 9/2002 | Phan-Anh et al. | |
| 2004/0090941 A1* | 5/2004 | Faccin et al. | 370/338 |
| 2006/0182083 A1* | 8/2006 | Nakata et al. | 370/352 |

FOREIGN PATENT DOCUMENTS

| | | | |
|---|---|---|---|
| EP | 1030491 A | 8/2000 | |
| EP | 1058421 A | 12/2000 | |

OTHER PUBLICATIONS

Johnson et al., "Mobility Support in IPv6." Internal draft version 18, IEFT, Jun. 1, 2002, p. 1-168. (http://tools.letf.org/html/draft-ietf-mobileip-ipv6-18).
"RFC 2000:IP Mobility Support," edited by C.Perkins, Network Working Group, IBM, Oct. 1996, p. 1-79, XP002187650.
International Search Report for PCT/IB2003/004979.

* cited by examiner

*Primary Examiner*—CongVan Tran
(74) *Attorney, Agent, or Firm*—Foley & Lardner LLP

(57) ABSTRACT

The invention discloses performing a care of address registration of a mobile node at a home server unit of a home network of the mobile node. The home network comprises a plurality of home server units which are arranged to maintain a binding between a home address of a mobile node and its current care of address from a visited network. According to the present invention, at the mobile node, a first home server unit is selected for registration and a binding update message is sent to the first home server unit. Thereupon, the first home server unit decides whether a binding update is to be rejected. In case the binding update is to be rejected, the first home server unit selects at least one second home server unit, includes information about the at least one second home server unit in a binding acknowledgment message rejecting the binding update and sends the binding acknowledgment message resulting therefrom to the mobile node.

16 Claims, 1 Drawing Sheet

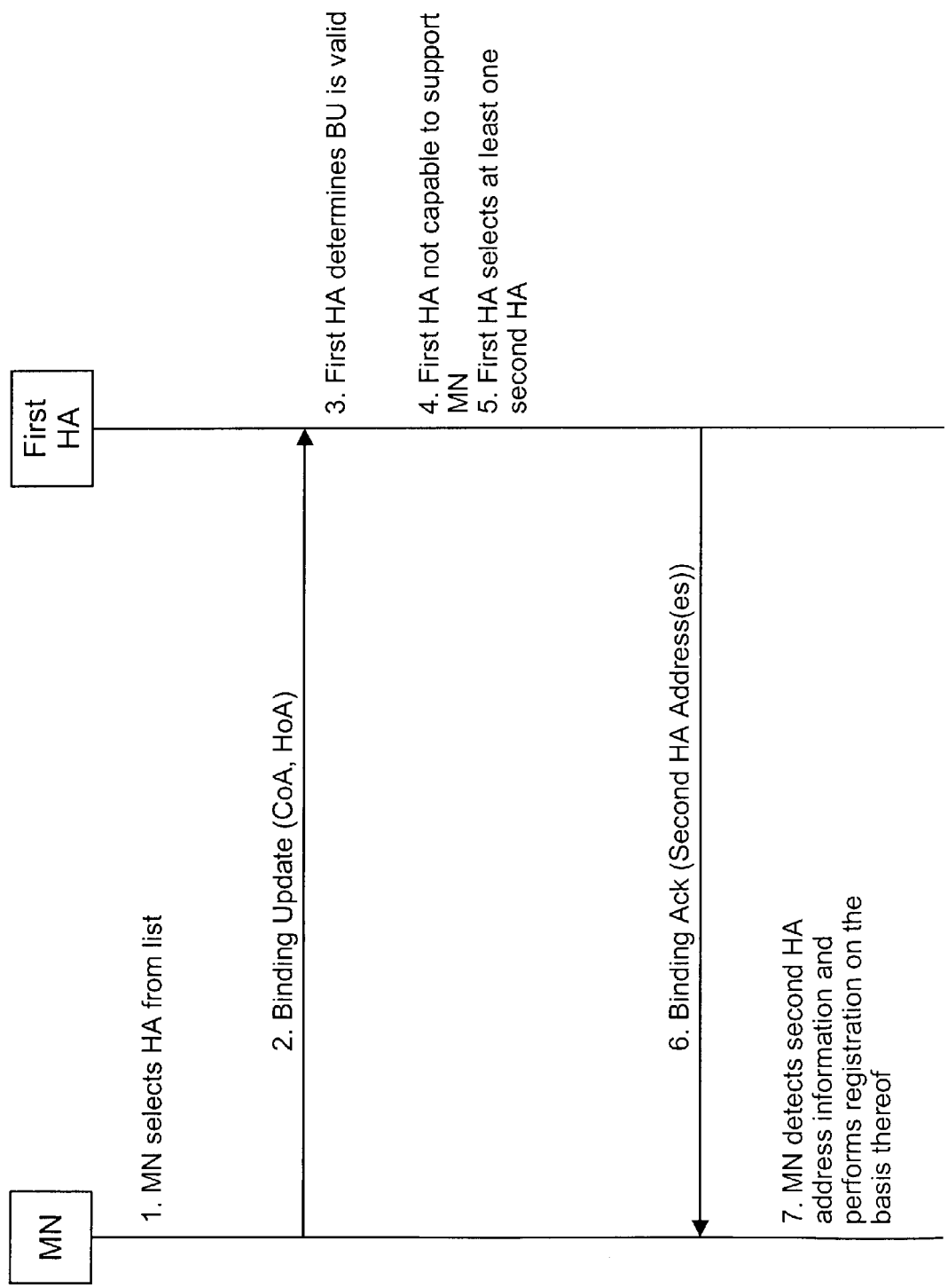

FAST RECOVERY FROM UNUSABLE HOME SERVER

FIELD OF THE INVENTION

In general, the present invention relates to IP (Internet Protocol) networks and is applicable in any network in which a protocol such as mobile IPv4 (Internet Protocol version 4) or mobile IPv6 is used to support the mobility of a user at the IP level, for example inter-access mobility in UMTS-WLAN (Universal Mobile Telecommunication System—Wireless Local Area Network) networks and intra-access but inter-access network mobility for operator's WLAN networks.

In particular, the present invention relates to performing a care of address registration of a mobile node at a home server of a home network of the mobile node, for example in accordance with mobile IPv6 protocol, the home network comprising a plurality of home servers being arranged to maintain a binding between a home address of a mobile node and its current care of address in a visited network.

BACKGROUND OF THE INVENTION

Mobile IP has a functionality for maintaining an association between a home address of a mobile node and its current topologically correct care of address from a visited network. For example, in mobile IPv6 protocol this functionality is called home agent which maintains the association, also known as a binding, between the home address of the mobile node and its current topologically correct care of address from the visited network. This functionality is described by D. Johnson, C. Perkins, J. Arkko in "Mobility Support in IPv6", Internet Draft version 18, Internet Engineering Task Force, Jun. 1, 2002, which document is referred to as reference (1) hereafter.

The home agent resides typically in the home network from where the mobile node has configured its "static" home address that is advertised through the DNS (Domain Name Server) system and that provides global reachability for correspondent nodes. Reference (1) mandates for the primary care of address registration a sequence of verifications to be performed for a binding update message before the registration can be accepted. According to mobile IPv4 protocol, the binding update message is a registration message.

In reference (1) it is described that the home agent verifies the binding update message, i.e. it checks whether it is a first home agent and whether the home address of the mobile node in the binding update message is an on-link address. Moreover, if the home agent chooses to reject the requested binding update for any other reason, e.g. due to insufficient resources to serve another mobile node as a home agent, then the home agent should return a binding acknowledgment message to the mobile node, in which a status field is set to an appropriate value to indicate the reason for the rejection.

There are several possible scenarios for the deployment of mobile IP in terms of how a mobile node (MN) can identify and locate a home agent (HA) in its home network:

MN performs dynamic HA discovery, i.e. it sends a request to an anycast address in the home network, and more precisely on the home link, and receives a response from an HA willing and capable to serve the MN;

MN is pre-configured, e.g. at subscription time, with the address of one or more HAs that can serve the MN, and the MN will use them according to a priority scheduling determined by a service provider (e.g. use always the first in the list and switch to the second one when the first one is not available, use a round-robin algorithm to select between them, etc.).

In the first scenario, two round trip messages are needed between the MN and the home network to register the MN with the HA and therefore make the MN reachable at the IP level. In general, this procedure can work but the signaling load required may be unacceptable in several situations, e.g. access over a wireless link. Also the delay involved in this procedure can be significant if the point of attachment of the MN is geographically far from the home network. Moreover, the HA discovery procedure is not secure.

In several deployments, the second scenario (i.e. HA addresses pre-configured in the MN) is more feasible. For example, a similar scenario is already adopted in other frameworks, e.g. to support VPN (Virtual Private Network) the addresses of the VPN gateways are pre-configured in the VPN client.

In this second scenario, the MN sends a binding update message to a primary HA in the list, i.e. the one that should be tried first. In case the HA is not able to serve the MN due to resources limitations, or due to configuration changes in the home network, e.g. the HA address is not valid anymore, as described above, the MN is provided with a reject information. At this point, the MN needs to try with another HA from its home agent list or try to discover a new one with the dynamic home agent discovery mechanism.

If the MN uses its local copy of the Home Agent list, it is likely that this list is stale because the information on the primary HA was also outdated, consequently the same is likely to apply with the other entries. In particular, if the home agents at the home network are using dynamic load balancing based on the advertised preferences there is a considerable possibility that the home agent list at the mobile node is not up to date with the load balancing status of the home network.

Alternatively, when receiving the reject information, the MN can perform the dynamic home agent discovery. However, this requires a round trip of messages between the MN and the HA and introduces an additional delay and extra messaging that might in some cases be harmful. This can happen for example when a home agent at a previous visited link is used for forwarding packets to a new home agent/router at a new link.

SUMMARY OF THE INVENTION

It is an object of the present invention to improve a care of address registration process between a mobile node and a home server.

According to the present invention, this object is achieved by a method of performing a care of address registration according to claim 1, a home server unit according to claim 7, a mobile node according to claim 11 and a communication network according to claim 14.

Further features of the present invention are defined in the dependent claims.

The present invention provides faster recovery from the primary home server, e.g. the primary home agent HA, being unable to serve the mobile node. In the case of a mobile node relying on its own copy of the home agent list, a possible inconsistency problem can be circumvented and in the case of the mobile node trying to apply the dynamic home agent discovery process faster home registration can be provided.

BRIEF DESCRIPTION OF THE DRAWING

The FIGURE shows a schematic diagram of a care of address registration process between a mobile node and a home server according to an embodiment of the present invention.

DESCRIPTION OF THE INVENTION

The FIGURE shows a process of performing a care of address registration of a mobile node MN at a home server unit of a home network of the mobile node according to an embodiment of the present invention. The home network comprises a plurality of home server units which are arranged to maintain a binding between a home address HoA of a mobile node MN and its current care of address CoA from a visited network. As it is illustrated in the FIGURE, the care of address registration may be performed in a mobile IPv4 or mobile IPv6 environment in which a home server is represented by a home agent HA.

In a first step the MN selects a first HA for registration. For example, the selected first HA is the primary one of a list of HAs maintained in the MN. In a second step the MN sends a binding update message to the first home agent. This message comprises the CoA and HoA of the MN. Although the mobile IPv6 term "binding update" is used here it is noted that the present invention is applicable to other protocols than IPv6. For example, in a mobile IPv4 environment the binding update message is a registration message.

In a third step the first HA receives the binding update message and performs verifications which may include checking whether the HA is the first HA and whether the HoA in the binding update message is an on-link address. Furthermore, the HA checks whether it is capable to support the MN, for example in view of sufficient resources for serving the MN.

In case it is decided in a fourth step that the first HA is not capable to support the MN and, therefore, the binding update is to be rejected, in a fifth step the first HA selects at least one second HA and includes information about the at least one second HA in a binding acknowledgment message rejecting the binding update. This information may contain global IP addresses of the selected HAs. In a sixth step the first HA sends the binding acknowledgment message including the second HA information and rejecting the binding update to the mobile node.

Finally, in a seventh step the MN detects the second HA information and performs a registration on the basis thereof, i.e. the MN sends a binding update message to the second Home Agent, etc.

According to mobile IP environment as described in reference (1) it is required that a home server must maintain a home server list which is used for a dynamic home server address discovery mechanism. This list contains those global addresses of all the other home servers with their preferences to serve as a home server. The home server list is constructed in a home server from the information learned through prefix information options in router advertisement messages that routers at the home network exchange with each other.

According to an embodiment of the present invention, the first home agent adds a home agent address discovery reply message as defined in reference (1) to the binding acknowledgment message. According to the present invention, the home agent address discovery reply message may be filled only with a single global IP address of a recommended alternative home agent that is preferred to act as a home agent. The alternative home agent may be selected from the home agent list maintained in the first home agent. The extended binding acknowledgment message then is returned to the mobile node requesting the care of address registration. In this way the size of the binding acknowledgment message remains small. If the mobile node wants to update the whole home agent list it may run the home agent discovery process.

According to a further embodiment of the present invention, the reception of a binding acknowledgment message from the first home agent in the home network with the above mentioned extension schedules a dynamic home address discovery in the mobile node once the handover is completed.

In an alternative embodiment, the home agent address discovery reply message is filled with global IP addresses of several recommended alternative home agents or all home agents of the home agent list maintained in the first home agent. In other words, with this embodiment, the home agent list can be sent directly with the rejection message to the mobile node requesting the care of address registration, obviating the need to use dynamic home agent discovery messages.

According to the present invention it is ensured that the mobile node requesting the care of address registration will find quickly an alternative home server without discovering a new one or relying on its own home server list that might not be up to date to the latest home server preferences.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method of performing a care of address registration of a mobile node at a home server unit of a home network of the mobile node, the home network comprising a plurality of home server units being configured to maintain a binding between a home address of the mobile node and its current care of address from a visited network, the method comprising:
   selecting, at the mobile node, a first home server unit for registration;
   sending a binding update message from the mobile node to the first home server unit;
   deciding whether a binding update is to be rejected in response to the received binding update message;
   in case it is decided that the binding update is to be rejected, selecting, at the first home server unit, at least one second home server unit, including information about the at least one second home server unit in a binding acknowledgment message rejecting the binding update and sending the binding acknowledgment message resulting therefrom from the first home server unit to the mobile node.

2. A method according to claim 1, in which the at least one server unit is selected from a home server unit list maintained in the first home server unit and containing other home server units with their preferences to serve as a home server.

3. A method according to claim 1, in which it is decided that the binding update is to be rejected when it is detected that the first home server unit has insufficient resources for serving the mobile node.

4. A method according to claim 1, in which the included information about the at least one second home server unit comprises a home server unit address discovery reply message containing a single global IP address of the at least one second home server unit.

5. A method according to claim 1, further comprising:
detecting the information about the at least one second home server unit in the binding acknowledgment message at the mobile node and performing registration at a second home server unit selected from the detected information.

6. A method according to claim 1, further comprising:
running a home server unit discovery process upon receipt of the binding acknowledgment message at the mobile node.

7. A home server unit of a home network of a mobile node, the home server unit being configured to perform a care of address registration of the mobile node, the home network comprising a plurality of home server units being configured to maintain a binding between a home address of a mobile node and its current care of address from a visited network, the home server unit comprising:
a receiving unit configured to receive a binding update message from the mobile node for registration at a first home server unit;
a deciding unit configured to decide that the binding update is to be rejected in response to the received binding update message;
a selecting unit configured to select at least one second home server unit in case the binding update is to be rejected;
an including unit configured to include information about the at least one second home server unit in a binding acknowledgment message rejecting the binding update in case the binding update is to be rejected; and
a sending unit configured to send the binding acknowledgment message which rejects the binding update and includes the information about the at least one second home server unit to the mobile node.

8. A home server unit according to claim 7, further comprising a unit configured to maintain a home server unit list containing other home server units with their preferences to serve as a home server unit, in which the selecting unit is configured to select the at least one second home server unit from the home server unit list.

9. A home server unit according to claim 7, further comprising a unit configured to detect whether the home server unit has insufficient resources for serving the mobile node, in which the deciding unit is configured to decide that the binding update is to be rejected when it is detected that the home server unit has insufficient resources for serving the mobile node.

10. A home server unit according to claim 7, in which the including unit configured to include in the binding acknowledgment message a home server unit address discovery reply message containing a single global IP address of the at least one second home server unit.

11. A mobile node being configured to request a care of address registration at a home server unit of a home network of the mobile node, the home network comprising a plurality of home server units being configured to maintain a binding between a home address of a mobile node and its current care of address from a visited network, the mobile node comprising:
a selecting unit configured to select a first home server unit for registration;
a sending unit configured to send a binding update message from the mobile node to the first home server unit;
a receiving unit configured to receive a binding acknowledgment message rejecting the binding update and the binding acknowledgment including information about at least one second home server unit; and
a detecting unit configured to detect the information about the at least one second home server unit in the binding acknowledgment message.

12. A mobile node according to claim 11, further comprising a unit configured to perform registration at a second home server unit selected from the detected information.

13. A mobile node according to claim 11, further comprising a unit configured to run a home server unit discovery process upon receipt of the binding acknowledgement message.

14. A communication network comprising a plurality of mobile nodes and a plurality of home server units being configured to maintain a binding between a home address of a mobile node and its current care of address from a visited network, in which the home server units are home server units according to claim 7 and the mobile nodes are mobile nodes according to claim 11.

15. A home server unit of a home network of a mobile node, the home server unit being configured to perform a care of address registration of the mobile node, the home network comprising a plurality of home server units being configured to maintain a binding between a home address of a mobile node and its current care of address from a visited network, the home server unit comprising:
means for receiving a binding update message from the mobile node for registration at a first home server unit;
means for deciding that the binding update is to be rejected in response to the received binding update message;
means for selecting at least one second home server unit in case the binding update is to be rejected;
means for including information about the at least one second home server unit in a binding acknowledgment message rejecting the binding update in case the binding update is to be rejected; and
means for sending the binding acknowledgment message which rejects the binding update and includes the information about the at least one second home server unit to the mobile node.

16. A mobile node being configured to request a care of address registration at a home server unit of a home network of the mobile node, the home network comprising a plurality of home server units being configured to maintain a binding between a home address of a mobile node and its current care of address from a visited network, the mobile node comprising:
means for selecting a first home server unit for registration;
means for sending a binding update message from the mobile node to the first home server unit;
means for receiving a binding acknowledgment message rejecting the binding update and the binding acknowledgment including information about at least one second home server unit; and
means for detecting the information about the at least one second home server unit in the binding acknowledgment message.

* * * * *